UNITED STATES PATENT OFFICE.

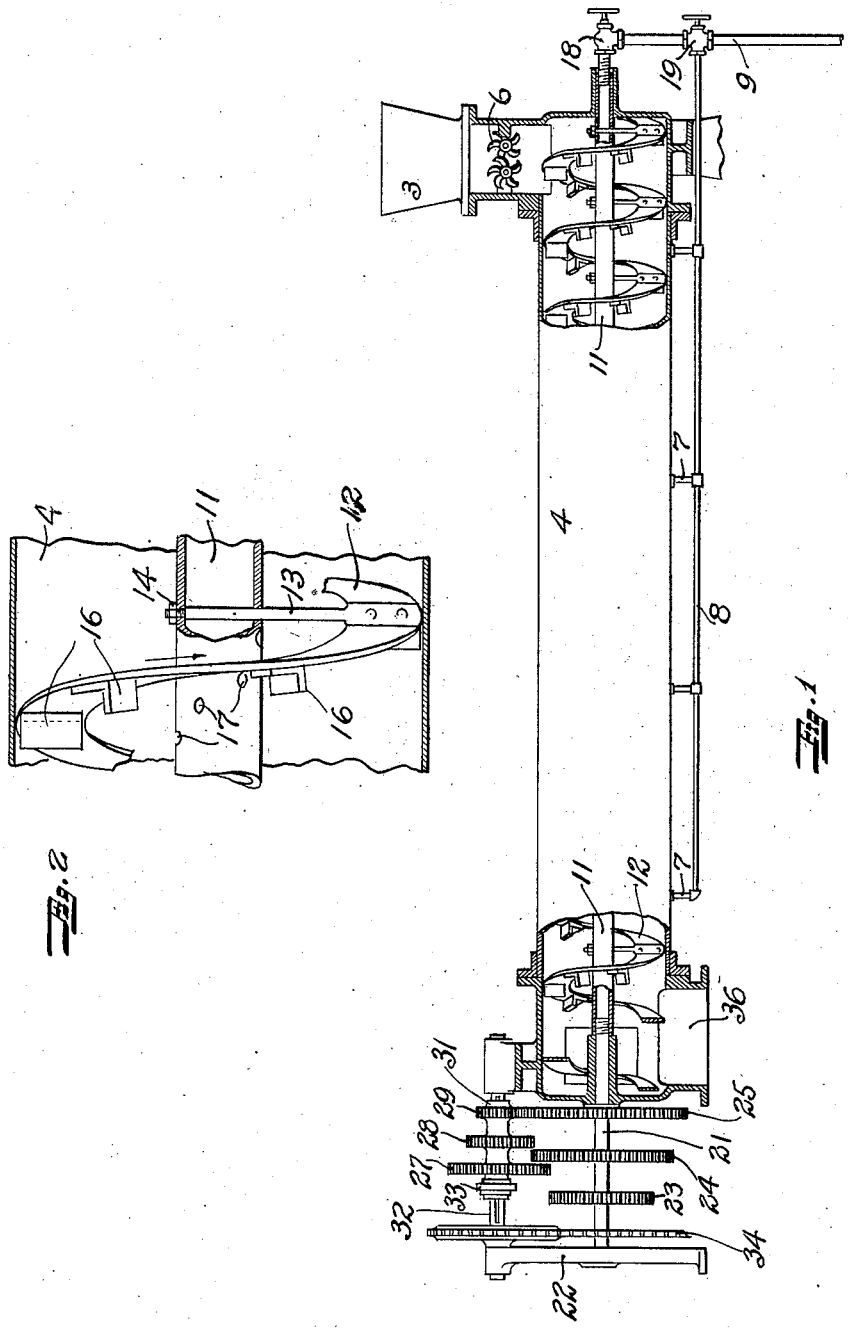

EDGAR T. MEAKIN, OF BERKELEY, AND FRANK E. BOOTH, OF SAN FRANCISCO, CALIFORNIA.

STEAM-COOKER.

1,307,508.  Specification of Letters Patent.  Patented June 24, 1919.

Application filed February 6, 1918. Serial No. 215,570.

*To all whom it may concern:*

Be it known that we, EDGAR T. MEAKIN and FRANK E. BOOTH, citizens of the United States, and residents of Berkeley, county of Alameda, and of the city and county of San Francisco, respectively, State of California, have invented a new and useful Steam-Cooker, of which the following is a specification.

Our invention relates to apparatus for cooking material in steam.

An object of our invention is to provide a steam cooker for cooking whole fish and fish scrap which operation forms part of the process for converting such material into fertilizer and chicken feed.

Another object of the invention is to provide an apparatus in which material may be agitated or tumbled while being subjected to the action of live steam.

The invention possesses other features of advantage, which, with the foregoing, will be set forth in the following description of the preferred form of our invention which is illustrated in the drawings accompanying and forming part of the specification. It is to be understood that we do not limit ourselves to the showing made by the said drawings and description, as we may adopt variations of the preferred form within the scope of our invention as set forth in the claims.

Referring to the drawings:

Figure 1 is a side elevation of the cooker, portions being shown in section.

Fig. 2 is a detail showing the construction of the cooker screw.

Broadly our invention comprises a drum in which the material to be treated is tumbled about as it is conveyed therethrough. Means are provided for injecting steam into the drum and also for playing jets of steam upon the material as it is carried along by the conveyer, so that the material is thoroughly cooked and the oil cells broken up.

The raw material is fed by a conveyer into the hopper 3 arranged at one end of the cylindrical drum 4. Preferably rotary cutters 6 of any suitable design are arranged in the hopper 3 so that the material passing into the cooker drum is coarsely divided.

Live steam is admitted into the cooker drum preferably along its bottom surface through a series of pipes 7 rising from the pipe 8 connected to the pipe 9, which in turn is connected to any convenient source of supply.

Means are provided in the cooker for conveying the material therethrough and for agitating or stirring the material, and for still further subjecting it to the action of live steam. A hollow shaft 11 is disposed in suitable bearings at each end of the cooker drum, and a helically wound strip or plate forming a ribbon conveyer 12 disposed thereon by arms 13. The arms pass through one side of the shaft 11 as shown in Fig. 2, and seat against the opposite side, where each is secured by a nut 14 threaded on a stud projecting from the end of the arm. At suitable intervals upon the screw 12 are fixed short plates 16 forming shelves or ledges which pick up bodily masses of material; and steam is played directly upon the material carried upon these ledges, from apertures 17 in the hollow shaft, positioned radially opposite each ledge. Steam is supplied to the hollow shaft through suitable connection with the pipe 9. Valves 18 and 19 are provided in the pipe 9 for controlling the admission of steam into the hollow shaft 11 and directly into the drum 4.

The left end of the hollow shaft 11 (as viewed in Fig. 1) is fixed upon a shaft 21 journaled in the end of the drum and in the frame 22. Variable speed means are provided for turning the shaft, and hence the screw 12 at the desired speed. Three gears 23, 24 and 25 are fixed upon the shaft 21 and are adapted to be engaged by gears 27, 28 and 29, respectively, fixed upon the sleeve 31, splined and longitudinally movable upon the jack shaft 32. A yoke 33 operated by a suitable handle in the usual way serves to move the sleeve to engage the desired set of gears, or disengage the gears. The shaft 32 is driven by chain 34 from any convenient source of power.

The speed of the conveyer is adjusted so that the length of time during which the material is passing through the drum is sufficient to thoroughly cook the material and break up the oil cells. At the end of its journey through the cooker drum, the material falls through the passage 36 into a suitable receptacle.

We claim:

1. A steam cooker, comprising a drum for the reception of material to be cooked, a hollow rotatable shaft in said drum and provided with apertures in the wall thereof, a conveyer disposed upon said shaft, means on said conveyer for tumbling the material during the rotation of the conveyer, and means for supplying steam to and rotating said hollow shaft.

2. A steam cooker, comprising a drum for the reception of material to be cooked, a hollow rotatable shaft arranged in said drum and provided with apertures in the wall thereof, a conveyer disposed upon said shaft, means on said conveyer opposite said apertures for tumbling the material during the rotation of the conveyer, and means for supplying steam to and rotating said hollow shaft.

3. A steam cooker, comprising a drum for the reception of material to be cooked, a ribbon conveyer in said drum, ledges spaced at intervals along the conveyer ribbon for collecting material thereon, and means for directing a jet of steam upon the material on each ledge.

4. A steam cooker, comprising a drum for the reception of material to be cooked, a hollow shaft arranged in said drum, a ribbon conveyer disposed upon said shaft, ledges spaced at intervals along said ribbon, said shaft being provided with apertures opposite said ledges, and means for supplying steam to said hollow shaft.

5. A steam cooker, comprising a drum for the reception of material to be cooked, means for conveying the material through said drum, means on said conveying means for gathering material and tumbling the same about the drum, means for directing jets of steam upon the material lodged on said gathering means, and means for admitting jets of steam into the bottom of said drum.

In testimony whereof, we have hereunto set our hands at San Francisco, California, this 25th day of January, 1918, by Booth, and on the 26th day of January, 1918, by Meakin.

EDGAR T. MEAKIN.
FRANK E. BOOTH.

In presence of—
B. C. Chester,
Leo Black.